No. 690,300.  
A. B. LANDIS.  
CUTTER HEAD.  
(Application filed May 1, 1901.)
Patented Dec. 31, 1901.
(No Model.)
4 Sheets—Sheet 1.
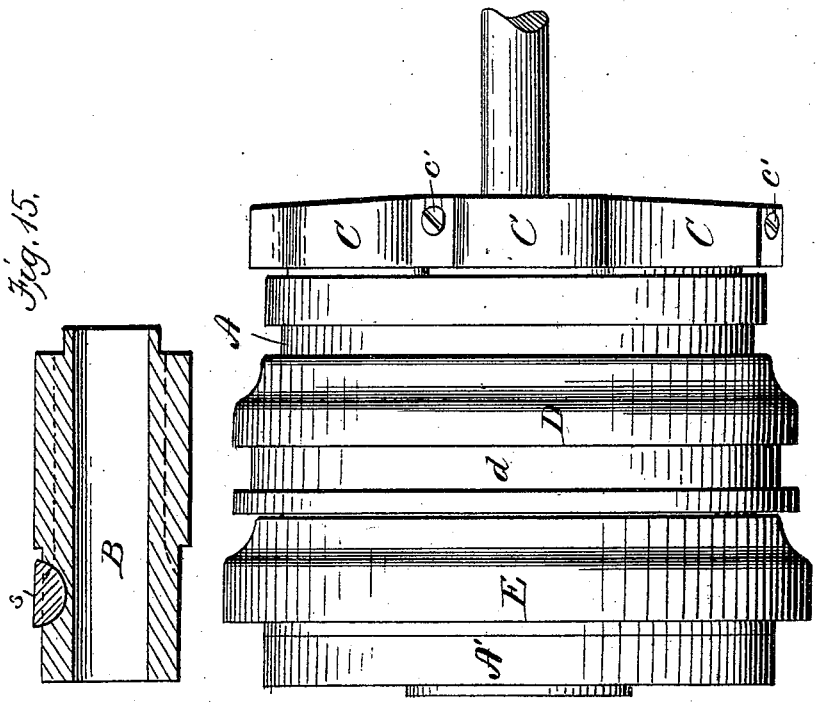
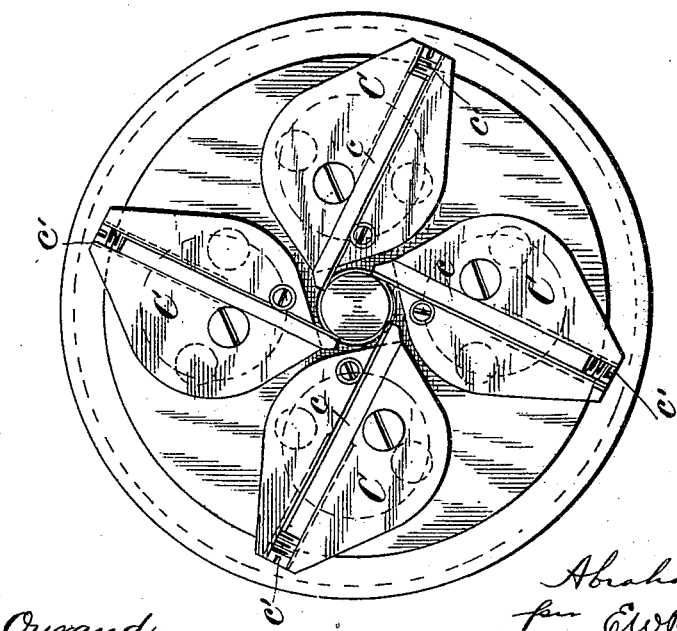
Witnesses  
Franck L. Ourand.  
Geo. M. Copenhaver
Inventor  
Abraham B. Landis  
per E. W. Bradford  
Attorney No. 690,300. Patented Dec. 31, 1901.
A. B. LANDIS.
CUTTER HEAD.
(Application filed May 1, 1901.)
(No Model.) 4 Sheets—Sheet 2.
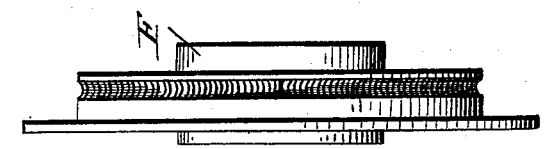
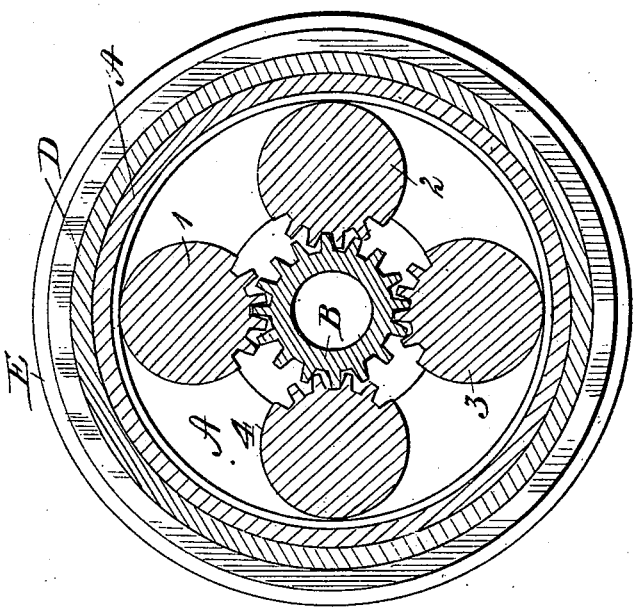
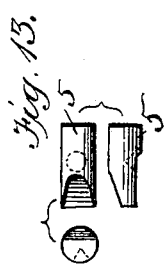
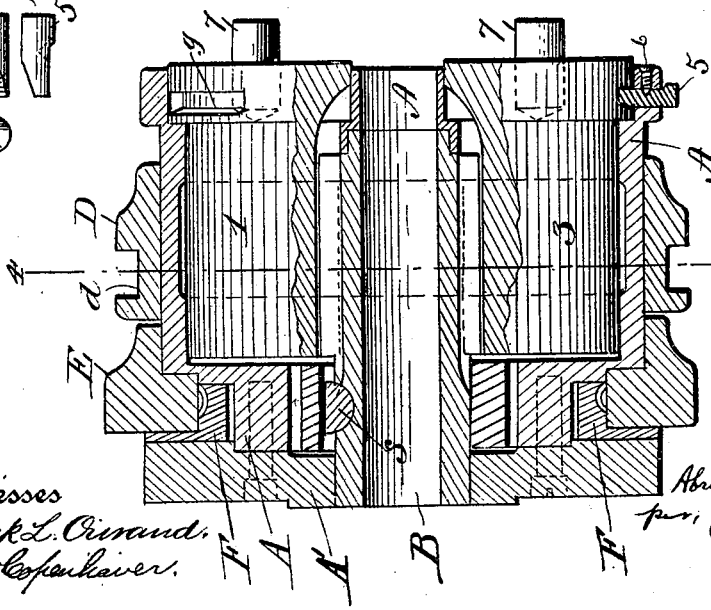
Witnesses
Franck L. Orrand.
Geo. M. Copenhaver.
Inventor
Abraham B. Landis,
per E. W. Bradford
Attorney No. 690,300. Patented Dec. 31, 1901.
A. B. LANDIS.
CUTTER HEAD.
(Application filed May 1, 1901.)

(No Model.) 4 Sheets—Sheet 3.

Witnesses
Franck L. Ourand.
Geo. M. Copenhaver.

Inventor
Abraham B. Landis,
per. E. W. Bradford.
Attorney.

THE NORRIS PETERS CO., PHOTO-LITHO., WASHINGTON, D. C.

No. 690,300. Patented Dec. 31, 1901.
A. B. LANDIS.
CUTTER HEAD.
(Application filed May 1, 1901.)
(No Model.) 4 Sheets—Sheet 4.

WITNESSES:
Franck L. Ourand
Geo. M. Copenhaver

INVENTOR
Abraham B. Landis,
BY
E. W. Bradford.
ATTORNEY

UNITED STATES PATENT OFFICE.

ABRAHAM B. LANDIS, OF WAYNESBORO, PENNSYLVANIA.

CUTTER-HEAD.

SPECIFICATION forming part of Letters Patent No. 690,300, dated December 31, 1901.

Application filed May 1, 1901. Serial No. 58,325. (No model.)

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in certain improvements in the construction of cutter-heads for machines for cutting threads on bolts, screws, &c., of that general character shown in my Patent No. 409,208, my present invention consisting, chiefly, in a new construction and arrangement of mechanism for operating the holders containing the cutters, all as will be hereinafter more fully described and claimed.

Figure 5:
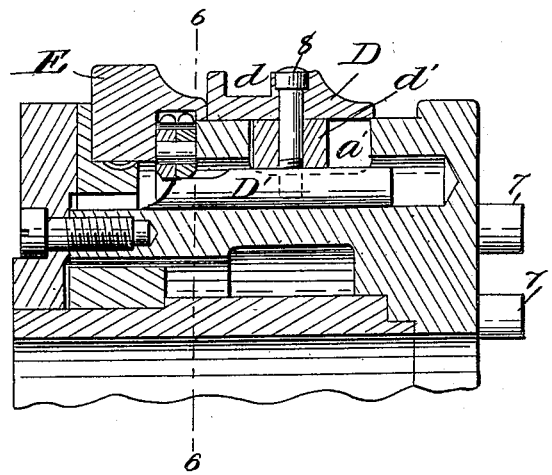
Figure 6:
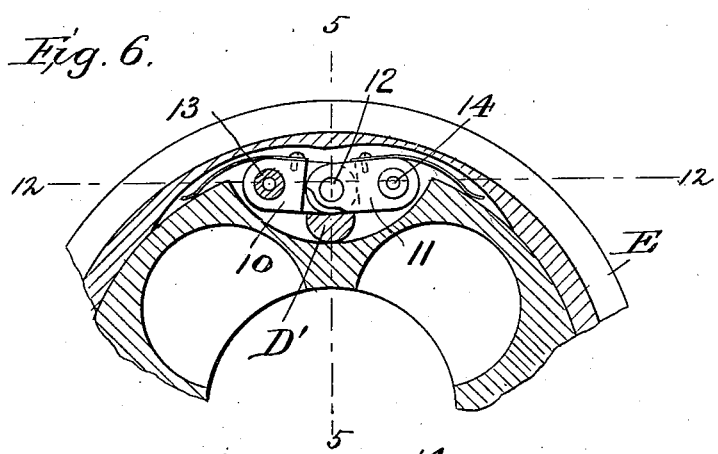
Figure 7:
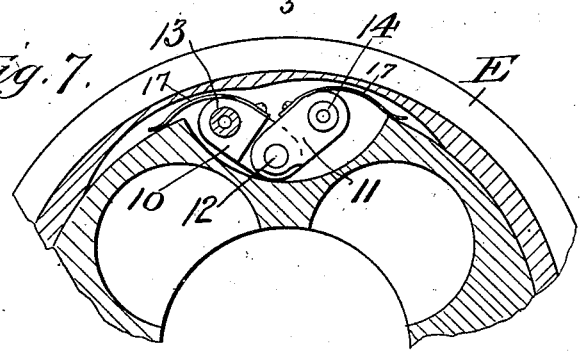
Figure 8:
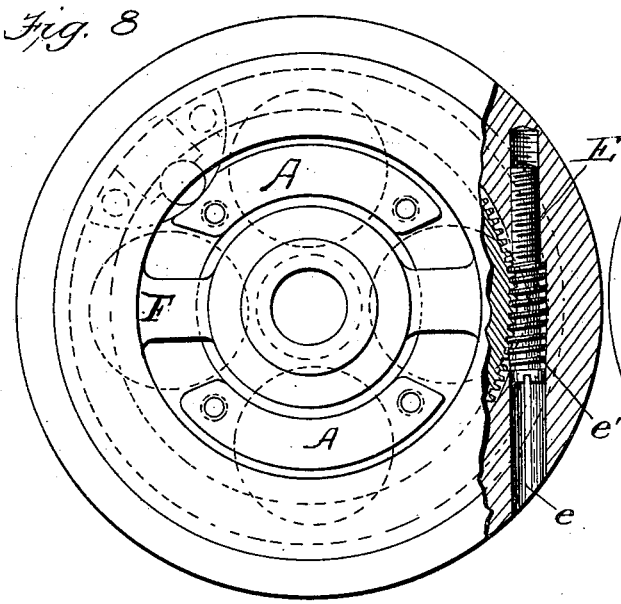
Figure 9:
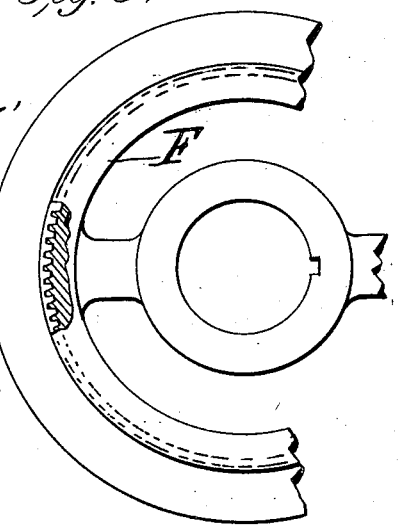
Figure 10:
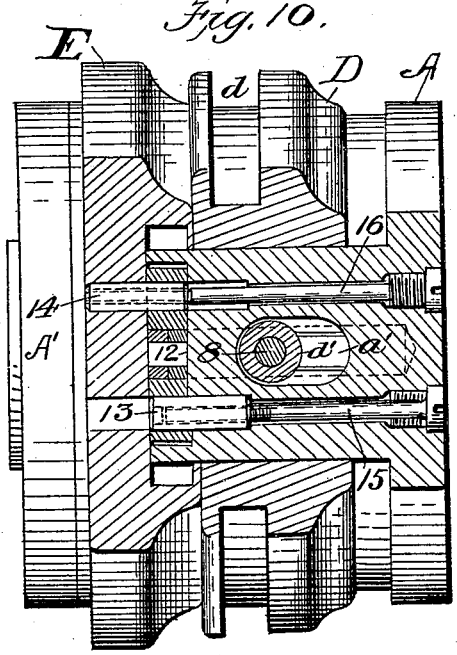
Figure 11:
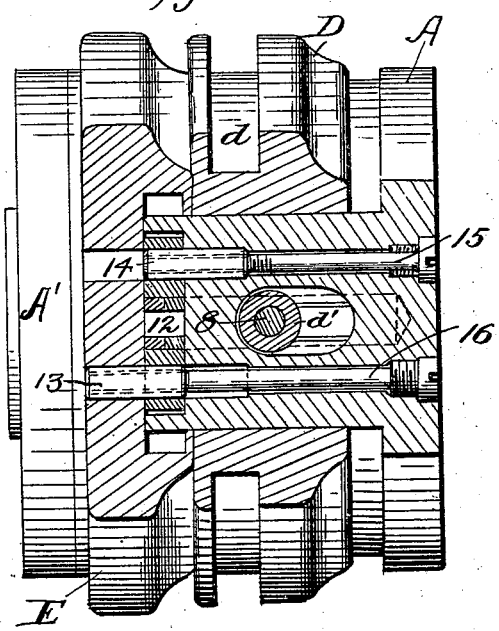

Referring to the accompanying drawings, which are made a part hereof, and on which similar reference characters indicate similar parts, Figure 1 is a front elevation of a cutter-head embodying my said invention. Fig. 2 is a side elevation of the same; Fig. 3, a longitudinal central section through the head; Fig. 4, a cross-section on the dotted line 4 4 in Fig. 3; Fig. 5, a detail longitudinal section on the dotted line 5 5, Fig. 6; Fig. 6, a detail cross-section on the dotted line 6 6 in Fig. 5, showing the parts in the position they occupy when the die is closed; Fig. 7, a view similar to Fig. 6, showing the parts in the position they occupy when the die is open; Fig. 8, a rear elevation, omitting the flange A', with a portion broken away to show the adjusting-ring and operating-screw; Fig. 9, a detail; Fig. 10, a horizontal section on the dotted line 12 12 in Fig. 6, showing the parts in one position; Fig. 11, a similar view showing the parts reversed; and Figs. 12, 13, 14, and 15, various details illustrating the various parts more clearly, as will be hereinafter pointed out.

In said drawings the portions marked A represent the casing of the cutter-head; B, a central sleeve mounted therein; C, the cutter-holders; D, an operating-sleeve mounted on casing A; E, an adjusting-ring secured on one end of said casing; F, a worm gear-wheel.

The casing A is a casting of appropriate form to contain and support the other portions of the mechanism. It has a rear flange A' bolted thereto, by which it is mounted on the spindle of the machine in the usual manner. It has a number of sockets or apertures arranged around a central opening, cylinders 1, 2, 3, and 4 being mounted to oscillate in said apertures. Said cylinders are each formed with teeth on a portion of their circumference adjacent to said central opening. The central sleeve B is mounted in said central opening in casing A and is formed with teeth on its circumference which mesh with the teeth on the adjacent portions of said cylinders 1, 2, 3, and 4. Said cylinders are held in position by flanges abutting shoulders near the outer ends of the apertures in casing A and by dogs 5 extending through said casing and engaging short grooves $g$ in the cylinders. The rear faces of said dogs and grooves are preferably tapered, as shown, so that as they are pushed to place the cylinders are forced back until the flanges rest snugly against the shoulders, thus preventing any looseness between the parts. Said dogs are preferably held in place by transverse set-screws 6. The dowel-pins 7 are firmly fixed in the front end of each cylinder.

The cutter-holders C are in most particulars of the same general arrangement as shown in my Patent No. 409,208, above mentioned, the differences being in detail. Two sockets are formed in the under side of each block or holder corresponding in size and arrangement to the dowel-pins 7, on which they are mounted. By this means, as will be seen, said holders and cutters are held rigidly with the cylinders 1, 2, 3, and 4, which in turn are geared to the central sleeve B.

The operating-sleeve D is mounted on the casing A and is adapted to move longitudinally thereon, a forked lever (not shown) being provided to engage with a circumferential groove $d$ therein for the purpose of operating it. A short longitudinal slot $a'$, Fig. 5, is formed in the casing A at an appropriate point under said ring and a block $d'$ mounted to slide therein. A screw 8 projects through said ring, block $d'$, and into a sliding wedge or cam D', mounted in a way in the casing and adapted to operate the mechanism for opening and closing the cutter-die, as will be presently described.

The adjusting-ring E is mounted on the rear end of the outside of the casing A and is connected therewith by toggle-links 10 and 11, which are hinged together by pintle 12 and connected at their opposite ends by pivots 13 and 14, one to the ring E and the other to the casing A. Said toggle is mounted in an appropriate recess in casing A, formed under ring E at a point between two of the cylinder-apertures, as shown in Figs. 5, 6, and 7, and are arranged to be connected at either end to the ring or casing, as shown in Figs. 10 and 11. By referring to said figures it will be seen that the pivots 13 and 14 are each adapted to slide through the end of its link into either the ring or the casing a distance which will connect said link with either of said parts and free it from the other. Each of said pivots is hollow and internally screw-threaded. Perforations in line with the pivot-sockets extend through the casing A to its front end, and long screws 15 and 16 are adapted to be mounted and operate therein. Screw 15 is screw-threaded at its inner end and is adapted to engage with the internal screw-threads of the pivots, while screw 16 is provided with a threaded portion just under its head, which is adapted to engage with a threaded portion around the outer end of the perforations in the casing. By driving screw 15 in until the parts are drawn together the pivot 13 or 14 will be drawn back into the socket in casing A and its link connected therewith. By driving screw 16 to its seat the pivot will be pushed into the socket in ring E and its link connected therewith. By this arrangement the parts can be reversed and the reversal of the motion of the ring E when operated and the connecting parts secured. The object of this reversal of motion is for adapting the head for cutting either right or left hand threads, which necessitates the opposite motions for opening the die. Fig. 1 shows the die-blocks C arranged for cutting right-hand threads. For cutting left-hand threads blocks made the reverse way would be substituted and the reverse motion be required for opening the die. The sliding wedge or cam D' is mounted to slide under the joint of said toggle-links. When operated to position shown in Figs. 5 and 6, said links will be straightened, as shown in Fig. 6, and the cutting-die closed, and when withdrawn from under said links they will drop to the position shown in Fig. 7, the springs 17 operating to insure this action, and thus open said cutting-die. A transverse socket e is formed in one side of said ring E, which cuts through its inner wall at its central portion. The lower end of said aperture is screw-threaded, and a screw E' is mounted therein. This screw is of the form shown in Fig. 14, also Fig. 8, being threaded at its lower end to operate in the threaded lower end of the aperture e, while having a worm e' or thread of greater pitch at its upper end which engages with the worm-gear on the circumference of wheel F. Said worm-wheel F is of the form most clearly shown in Fig. 12 and is mounted on the central sleeve B in a recess between the rear end of the casing A and rear flange A' and with its worm under the ring E in position to engage with the worm e' of screw E'. It has segmental openings through which the projecting portions of casing A, to which flange A' is secured, extend, as shown. It is secured to the central sleeve by a spline s. (See Fig. 3.) It will thus be seen that ring E and wheel F are connected by screw E' to move together and that by the adjustment of said screw their relative positions will be changed and the size of the cutting-head adjusted and secured as desired.

The operation will readily be understood from the foregoing, but may be briefly recapitulated. The size of the die is regulated through the adjustment of screw E'. The die is opened and closed by sliding the operating-ring D in the appropriate direction, which, through the wedge or cam D', operates the toggles, as before described, and through them the ring E, wheel F, sleeve B, cylinders 1, 2, 3, and 4, and the holders C, carried thereby, which contain the cutters c, and constitute the cutting-die. Said cutters c may be adjusted by means of screw-followers c', mounted in the grooves behind them, and secured as in said Patent No. 409,208.

Having thus fully described my said invention, what I claim as new, and desire to secure by Letters Patent, is—

1. In a cutter-head, the combination, of the casing, the cutter-dies rigidly mounted on oscillating parts, a gear engaging each of said parts, an adjustable connection between said gear and casing, and operating devices for effecting the adjustments, substantially as set forth.

2. In a cutter-head, the combination, of the casing, cylinders mounted to oscillate in said casing, cutter-holders carried by said cylinders, cutters in said holders, a central gear mounted in said casing to engage with a gear on each of said cylinders, a gear-wheel connected therewith adjustably connected with said casing, and means for operating the same, substantially as set forth.

3. In a cutter-head, the combination, of the casing, the cylinders mounted therein provided with teeth, a central gear engaging with the teeth of said cylinders, cutters carried by said cylinders, connections between said central gear and casing whereby they may be held in fixed relation and rocked in relation to each other, and the operating means, substantially as set forth.

4. In a cutter-head, the combination, of the casing, the cylinders mounted to operate therein and formed with gear on their adjacent sides, cutters carried by said cylinders, a central sleeve with gear on its periphery engaging the gear of each cylinder, a worm-wheel on said sleeve, a ring surrounding said worm-wheel having a worm which engages said worm-wheel, a toggle connection between said ring and the casing, and means for operating said parts, substantially as set forth.

5. In a cutter-head, the combination, of the casing, the oscillating cylinders therein having gear on adjacent sides, a central sleeve with gear engaging the gear of said cylinders, cutters on said cylinders, a connection between the central sleeve and the casing embodying toggle-links, and means for operating said toggle-links to shift the relative positions of the parts, whereby the cylinders are rocked to open or close the cutters, substantially as described.

6. In a cutter-head, the combination, of the casing, the oscillating parts carrying the cutters, means for adjusting them to different-sized work through a connection with the casing, and means for opening and closing the die while set to the desired adjustment, substantially as set forth.

7. In a cutter-head, the combination, of the casing, the cutters mounted on parts adapted to be rocked, gear connecting them, a part connecting said gear with the casing comprising an adjusting device for changing the relative positions of the parts, whereby the die may be set to the size desired, and means for opening and closing the cutting-die, substantially as set forth.

8. In a cutter-head, the combination, of the casing, the cutters carried by cylinders, said cylinders formed with gear on adjacent sides and mounted in said casing in bearings around a central opening, a central sleeve mounted in said central opening provided with gear engaging the gear of said cylinders, a worm-wheel geared to said sleeve, a ring mounted on the end of said casing and connected to said wheel by a screw engaging its worm, whereby the relative positions of the ring and wheel may be adjusted, toggle-links connecting said ring with the casing, a sliding cam for operating said links, and means for sliding said cam back and forth, substantially as set forth.

9. In a cutter-head, the combination, of the casing, the cylinders, the cutters mounted thereon, the central sleeve geared to said cylinders, the wheel connecting said sleeve with the casing through the toggle-link connection, said toggle-links one of which is pivoted to the casing and the other to a part connected with said wheel by reversible pivots, whereby said connections may be reversed, substantially as set forth.

10. In a cutter-head, the combination, of the casing, the cutters mounted on oscillating parts in said casing, the operating-gear, a toggle-link connection between said operating-gear and the casing, means for operating said toggle-links, and means for adjusting the pivots of said toggle-links, whereby they may connect either link with either part, substantially as set forth.

11. In a cutter-head, the combination, of the casing, the cutters mounted on cylinders or spindles, said cylinders or spindles mounted in bearings arranged around the center of said casing and provided with gear on adjacent sides, a central gear connected with the gear of said sleeves, a wheel connected to said central gear, a ring connected to said wheel by a worm-gear connection, and toggle-links connecting said ring to the casing, and means for operating said toggle-links, substantially as set forth.

In witness whereof I have hereunto set my hand and seal, at Waynesboro, Pennsylvania, this 13th day of April, A. D. 1901.

ABRAHAM B. LANDIS. [L. S.]

Witnesses:
ALF. N. RUSSELL,
GEO. H. RUSSELL.